United States Patent [19]
Gavit

[11] Patent Number: 6,078,478
[45] Date of Patent: Jun. 20, 2000

[54] READ/WRITE RECORDING DEVICE AND HEAD POSITIONING MECHANISM THEREFOR

[76] Inventor: Stephan E. Gavit, 11480 W. Bear Creek Dr., Lakewood, Colo. 80227

[21] Appl. No.: 08/945,479

[22] PCT Filed: Sep. 11, 1997

[86] PCT No.: PCT/US97/16153

§ 371 Date: Oct. 24, 1997

§ 102(e) Date: Oct. 24, 1997

[87] PCT Pub. No.: WO99/13461

PCT Pub. Date: Mar. 18, 1999

[51] Int. Cl.[7] .................................................. G11B 5/56
[52] U.S. Cl. ............................................................ 360/109
[58] Field of Search .................................. 360/104–106, 360/109

[56] References Cited

U.S. PATENT DOCUMENTS

| | | |
|---|---|---|
| 3,370,131 | 2/1968 | Reed . |
| 3,624,309 | 11/1971 | Dattilo . |
| 3,705,270 | 12/1972 | Huber . |
| 3,839,737 | 10/1974 | Vogel . |
| 4,363,046 | 12/1982 | Saito . |
| 4,646,183 | 2/1987 | Cohen . |
| 5,731,933 | 3/1998 | Sonderegger et al. .................. 360/106 |
| 5,920,445 | 7/1999 | Angellotti et al. ...................... 360/106 |

*Primary Examiner*—Allen T. Cao
*Attorney, Agent, or Firm*—Timothy J. Martin; Michael R. Henson; Mark H. Weygandt

[57] ABSTRACT

A recording device (10) operative to read and write data on a recording medium (200) has a support frame (26), a take-up mechanism (24), bearing elements (18, 22) on opposite sides of a recording head (20). The recording head (20) is mounted for translational movement by a positioning assembly which includes a pair of flexure plates (54, 56) having flexure portions (120, 150) defining torsional springs with oppositely acting torques to resist rotational movement of the recording head (20) during reciprocal movement. A drive includes a stepper motor (96) that operates a shaft cam (94) that bears against a head cam block (86) to move flexure portion (120) and a recording head (20) against a restorative force of flexure portions (120, 150). Cam nuts (34, 48) adjust skew and a cam element (107) adjusts tape penetration.

24 Claims, 4 Drawing Sheets

READ/WRITE RECORDING DEVICE AND HEAD POSITIONING MECHANISM THEREFOR

FIELD OF THE INVENTION

The present invention broadly concerns electronic recording devices and particularly concerns supports used to position read/write recording heads especially for selected, reciprocal translational movement in multi-track recording. The present invention particularly concerns controlled movement of a read/write head along a linear axis while eliminating rotational movement thereabout in a manner that allows greater precision. With such greater precision, the present invention contemplates increasing the density of recorded data on a selected medium by increasing the plurality of tracks that may be made on that medium.

BACKGROUND OF THE INVENTION

The advent of the computer has already had a profound effect upon human society, and the impact of processing technology is expected to increase. Indeed, the desirability to store information for subsequent retrieval currently grows at an exponential rate. Thus, various types of devices have been developed to store data both for on-line usage as well as for archival purposes.

Where on-line processing requires data to be readily at hand, a significant improvement was provided by the advent of the magnetic disk storage array. Here, one or more magnetic disks are provided, and a read/write recording head is used to record information on the disk as well as to retrieve information or data for use by the computer processor. Significant strides have been made in the ability to increase the density of data stored on such magnetic disk arrays.

In order to gain an even higher density for on-line data, the optical disk was developed. These devices record data based upon a very small wavelength of light so that a higher density is obtained due to this technique. Laser light is employed to read the stored information or data on the optical disk. However, once imprinted, the disk presently cannot be rewritten although significant research is underway in an effort to develop such technology.

In early days of the computer, before the advent of the magnetic disks and the optical disk storage assemblies, data was typically stored on magnetic tapes, such as reel-to-reel tapes and later cassettes. In a magnetic tape storage device, a magnetic coil is used as a transducer both to imprint data magnetically on a moving band of magnetic film; thereafter, when the film is advanced across the transducer, the data may be read and re-input into a co-processor. Magnetic tape can be erased and rewritten many times and has an advantage of low cost.

Magnetic tape is still a highly desirable format for archiving data for rapid access is of less significance and cost is of concern. However, where vast quantities of data are to be maintained, these tapes can be bulky due to the physical number necessary to store the quantity of data. The capacity for such tapes to store data, of course, is dependent upon the number of "tracks" which can be independently placed across the width of the tape. Thus, for example, a magnetic tape read/write system that is able to read and write nine tracks of data on a single strip of tape will hold four and one-half times the amount of data as a system which only utilizes two tracks. Therefore, efforts to increase the capacity of magnetic tapes to store data have included substantial efforts to increase the number of tracks which can be written on a band of magnetic tape.

In order to increase the density of data stored onto a magnetic tape, one technique has been to support a plurality of individual read/write transducers in an array on the read/write recording head. For example, where eight transducers are placed side-by-side across the head, eight tracks can be simultaneously written or read as the tape is translated across the head and the tape advance direction. In order to provide this number of transducers, however, they may need to be very small in size. Importantly, the reduction in size of the transducer results in a substantial portion of unused magnetic tape in bands extending parallel to and in between each recorded tack. Therefore, in order to further increase density, it is now a common practice to write data in between the tracks so that, for example, a tape head that includes eighteen transducers may be first used to record a set of eighteen tracks after which the tape may be rewound and the head shifted half of the distance between the tracks and a set of eighteen more tracks recorded for a total of thirty-six tracks on the tape band. The ability to create multi-track storing, then, becomes dependent upon the precision with which the tape head may be translated to create the different sets of tracks.

In the typical technique for translating a read/write recording head employs a lead screw that is threaded into a threaded nut associated with the tape head. Rotation of the threaded shaft, for example, by a stepper motor, then can translate the tape head a desired distance. While this technique is useful in increasing the ability to do multi-track recording, a lead screw assembly includes an inherent "sloppiness" as a result of the need to have some gaps between the lead screw threads and the threads to avoid binding during use. In order to compensate for this sloppiness, it is known to use threaded lead screws wherein ballbearings reside in the threads to help to remove the sloppiness. While this technique does increase precision, a lead screw assembly necessarily has a large mass so that, as the tape head is shifted, substantial momentum and energy must be overcome, especially at the extrema of the translated distance.

In addition to the use of lead screws, it has been known to use camming structures as a mechanism for translating a read/write recording head transversely across a tape medium so as to read multiple discrete tracks on such tape. One such example is shown in U.S. Pat. No. 3,705,270 issued Dec. 5, 1992 to Huber. In this patent, a read/write recording head is secured to a carriage which slides on a pair of rails so that the read/write head may translate transversely across the tape. The carriage is biased for abutment against a spherical cam follower that is sandwiched between the carriage and a rotatable cam. The cam has a plurality of steps that provide incremental movement of the read/write recording head.

U.S. Pat. No. 3,839,737 issued Oct. 1, 1974 to Vogel also employs a stepped cam to move a read/write recording head transversely of the tape medium. Here, however, the cam follower is in the form of a following post that rides on the surface of the cam. U.S. Pat. No. 3,370,131 issued Feb. 20, 1968 to Reed also shows a pin type cam follower that moves a transducer. In the Reed Patent, however, the cam surface is an inclined plane without discrete steps. Movement of the cam surface is accomplished by a rack and pinion gear assembly.

In my co-pending application Ser. No. 08/588,211 filed Jan. 19, 1996, and now U.S. Pat. No. X,XXX,XXX, a positioning assembly utilizing a cam in the form of either a continuous cam surface, a stepped cam surface or a cam employing individually sized bearings is disclosed for the precise adjacent of a follower shaft that supports a read/write recording head. This patent application recognized the need to prevent angular rotation of the read/write recording head during translational movement, and the patent application discloses a mechanical structure for preventing angular rotational movement during reciprocal translation of the read/write head.

Despite the development of the above described positioning devices, there remains a need for head positioning assemblies that are increasingly more precise in positioning a read/write head on a multi-track recording medium so as to allow an increasingly large number of tracks to be introduced on and read by such a recording head. There has been a further need for simplified structures and recording devices which use these structures. There has been a particular need for positioning structures for read/write recording heads that reduce or eliminate angular rotation of the read/write head during translational movement without impeding such translational movement.

SUMMARY OF THE INVENTION

It is an object of the present invention to provide a new and useful positioning assembly for a read/write recording head as well as a read/write recording device incorporating that head positioning mechanism.

Another object of the present invention is to provide a positioning mechanism for a read/write recording head that is simplified in structure and less expensive to produce.

Yet another object of the present invention is to provide a positioning device for read/write recording heads that can precisely position the head for higher density multi-track recording and reading.

A further object of the present invention is to provide a positioning mechanism for read/write recording heads that reduces and/or eliminates rotational movement of the read/write recording head while it is translating along a linear axis.

Yet a further object of the present invention is to provide a positioning mechanism for read/write recording heads that has both skew adjustment and tape penetration adjustment features which are independent of one another.

Still a further object of the present invention is to provide a read/write recording device that incorporates the positioning mechanism having the objects stated above.

According to the present invention, then, a positioning mechanism is operative to selectively position a recording head relative to a support structure which supports that recording head. Broadly, the positioning mechanism includes a drive that is operative to translate the recording head along a linear axis such that the recording head is positionable at intermediate positions between first and second locations. First and second torsion springs are then disposed in opposite ends of the recording head and are arranged to apply opposite angular torques to the recording head thereby to resist rotational movement of the recording head about the linear axis. Adjustments are provided for both skew and tape penetration.

The first and second torsion springs are each preferably formed out of a flat flexure plate having a cut profile that defines a flexure portion thereof. The opposite ends of the recording head respectively engage the flexure portions of the first and second torsion springs. The cut profile may be defined by a pair of U-shaped cuts with one of the U-shaped cuts being inverted with respect to one another and with those U-shaped cuts overlapping one another to define the flexure portion. The cut profiles are preferably identical with respect to one another with the cut profile on the second flexure plate being rotated 180° to the cut profile on the first flexure plate relative to an axis that is perpendicular to the linear axis. The recording head may be secured to one or both of the flexure portions of the torsion spring, and this interconnection can include a spacer block as necessary for the particular recording device environment in which the positioning mechanism is employed.

The drive which translates the recording head may be of various types known in the art, but preferably is formed by a rotatable first cam having a first cam surface oriented transversely to the linear axis. A motor is operative to rotate the first cam such that the cam surface operates to translate the recording head in a first direction along the linear axis against a restorative force of one of the first and second torsion springs. A head cam block is preferably provided to interact with the rotatable cam, with the head cam block being secured to one of the first and second torsion springs. The head cam block has a second cam surface oriented transversely to the linear axis with the second cam surface being engaged by the first cam surface.

The present invention also includes a head assembly that is adapted to read/write data on a recording medium that is advanced in a feed direction by a transport mechanism that includes a support frame. The head assembly according to the invention includes the structure described above in combination with a recording head that is disposed between the interior surfaces of flexure portions of first and second flat torsion springs. A drive again is disposed at one end of the recording head and advances the recording head in a first direction against the restorative force of one of the torsion springs such that the restorative force returns the recording head in a second direction along the linear axis. Again, the first and second flexure portions are configured and oriented so that the first flexure portion applies a first angular torque that is opposite a second angular torque force applied by the second flexure portion so as to cancel angular rotation of the recording head about the linear axis. Each of the torsion springs is preferably formed of a flat plate with the second flat torsion spring being thicker than the first flat torsion spring so that it has a larger spring constant than the first torsion spring. Adjustment structure is also provided to permit alignment of the linear axis transversely at the tape feed direction so that the recorded tracks may be properly read.

Finally, the present invention also includes a device that is operative to read/write data on a recording medium. The device includes a support frame having a docking station that is adapted to receive a holder for a recording medium. A take-up mechanism is provided that is operative to advance the recording medium in the feed direction, and bearing elements are disposed on the support frame and are operative to support the recording medium as it is advanced in the feed direction from the holder to the take-up mechanism. A recording head is disposed adjacent to the recording medium as it is advanced in the feeding direction with the recording head being oriented transversely to the feed direction. First and second flat torsion springs are then supported on the support frame, with each having a flexure portion with opposed facing interior surfaces. The recording head has a first end that engages the first flexure portion of the first flat torsion spring while the recording head has a second end that engages the second flexure portion of the second torsion spring. A drive is then disposed at a first end of the recording head and is operative to advance the recording head in a first direction along the linear axis and against the second flexure portion such that a restorative force is applied by the second flexure portion to return the recording head in a second direction along the linear axis. Again, the flexure portions are configured and oriented so as to have canceling angular torque forces to resist angular rotation of the recording head about the linear axis.

These and other objects of the present invention will become more readily appreciated and understood from a consideration of the following detailed description of the exemplary embodiment when taken together with the accompanying drawings, in which:

DETAILED DESCRIPTION OF THE EXEMPLARY EMBODIMENT

The present invention concerns read/write recording devices adapted to selectively write data onto a recording medium. More particularly, however, this invention concerns a positioning mechanism which is operative to translate a read/write recording head reciprocally in a linear direction transversely to the direction of movement of the recording medium past the recording head so as to read one or more tracks on that recording medium. Although this invention is described specifically with respect to the recording of information and data on a magnetic tape recording medium for subsequent retrieval, it should be clearly understood that the positioning mechanism of the present invention may be used with other recording medium.

For purposes of this description and the claims contained herein, the term "recording head" will be used to refer to either a "read only" transducer head, a "write only" transducer head or to a combination of a read/write transducer head. Moreover, it should be understood that the term "tape" or "recording media" is used to refer to magnetic media, optical media or any similar data storage technology now used or hereinafter developed with which the read/write head can be employed.

Figure 1:
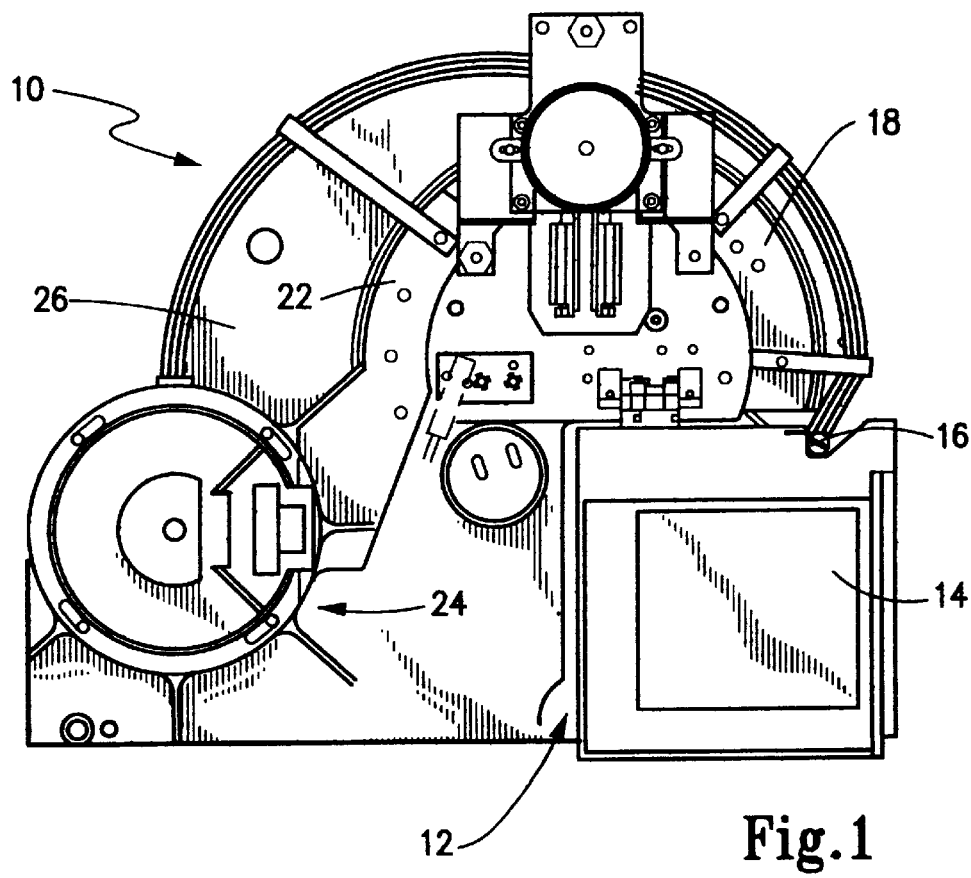
FIG. 1 is a front view in elevation showing a read/write recording device incorporating the positioning mechanism of the present invention.

Turning first to FIG. 1, it may be seen that a recording device 10 according to the first exemplary embodiment of the present invention is operable to read and write data on a recording medium. Recording device 10 has a docking station 12 which receives a supply of the recording medium, for example, as contained in cassette or holder 14. Tape from holder 14 is advanced in a feed direction by a leader arm 16 so that it is threaded across a first air bearing 18, a read/write recording head 20 and a second air bearing 22. The tape medium is then introduced to a take-up spool 24 as is known in the art wherein it is wound during reading of the tape as it is translated between holder 14 and take-up spool 24. After the read/write operation, the tape medium is rewound into holder 14 so that holder 14 may be removed and stored. Recording device 10 includes a support frame 26 that provides the docking station for recording device 10. It should be understood that recording head 20 is disposed adjacent to the recording medium when the recording medium is advanced in the feed direction with the recording head being oriented transversely to the feed direction along a linear axis "L" along which recording head 20 may be reciprocally translated.

With reference now to FIGS. 1–4, it may be seen that the present invention provides a new and useful positioning mechanism that is operative to selectively position the recording head 20 relative to the support structure 26 which supports the recording head. As is shown in these figures, support structure 26 includes a yoke-shaped support element 28 that has an interior chamber 30 sized to receive a standard recording head, available from head manufacturers, for example, IBM Corp., STK Corp., Seagate Corp., Hitachi Corp. or Fujistu Corp. Chamber 30 is open at both the front and rear sides of recording device 10. Support element 28 is secured to framework 26 and is adapted to mount a recording head support as well as to secure a motor support in the form of a skew plate 42 to support structure 26. To this end, a bolt 32 extends through a bore 33 in support element 26 and a bushing 40 is received over bolt 32 in close fitted telescopic engagement. A first cam nut 34 is matably received on bolt 32 and bushing 40 and is affixed to the interior surface 29 of support element 28 by any suitable means, such as an adhesive. A second cam nut 48 is also matably received on bolt 32. Nuts 34 and 48 have facing cammed surfaces 35 and 49, respectively.

Framework 26 has two cooperating mounting posts 36 and 38 which project forwardly of support frame 26 at a central region of recording device 10 adjacent respectfully to air bearings 18 and 22. Mounting post 36 has an inner threaded bore 37 while mounting post 38 is in the form of a threaded shaft that is rigidly secured to support frame 26. Mounting post 40 is dimensioned to have a diameter similar to bolt 32 so that post 38 can telescopically receives a bushing 40, a cam nut 34 and a cam nut 48. Here again, cam nut 34 is affixed to support frame 26 so that it is prevented from rotation. Cam nuts 34 and 48 have facing cam surfaces 35 and 49, respectively.

Skew plate 42 is then secured to framework 26 by mounting posts 36 and 38 along with bolt 32 passing through mounting element 28. Thus, skew plate 42 rests on cam nuts 48 as well as the upper surface of mounting post 36. A bolt 45 extends through an opening 46 in skew plate 42 so that it may be fastened into the threaded bore 37 of post 36. Washers 43 and nuts 44 are received on the threaded ends of bolt 32 and threaded post 38 which pass through bores 46 and skew plate 42.

Figure 3:
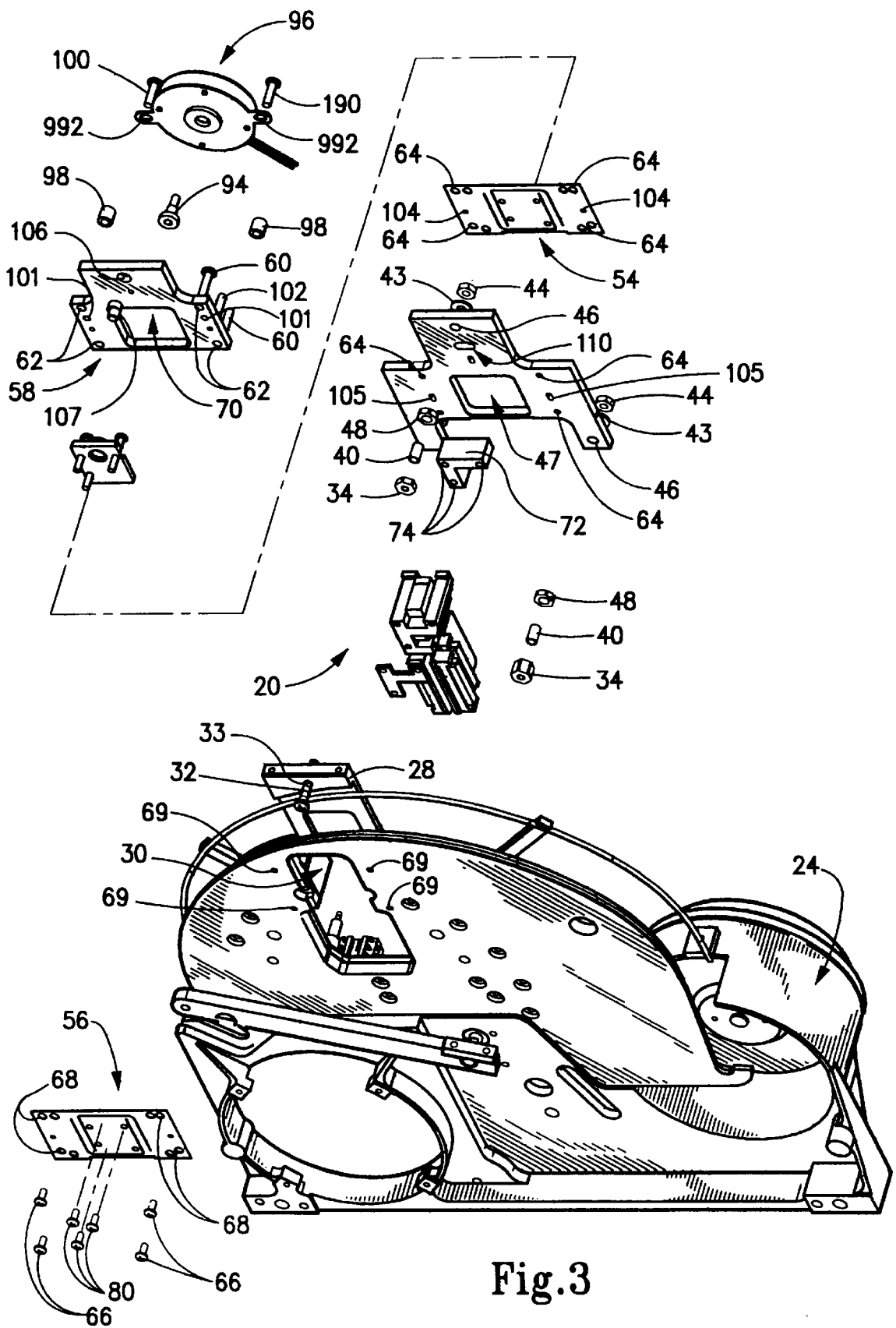
FIG. 3 is a rear exploded view in perspective of the read/write recording device of FIG. 1.

A first flexure plate 54 and a second flexure plate 56 are mounted in spaced apart facing relation to one another so as to substantially enclose chamber 30 of support element 28. To this end, as is seen in FIG. 3, skew plate 42 has a central cavity 47 that opens into chamber 30 of support element 28. First flexure plate 54 confronts skew plate 42 and is secured thereto by means of a flexure retainer plate 58 and bolts 60. Bolts 60 extend through bores 62 in retainer plate 58 and fasten in threaded openings 64 in skew plate 42 such that first flexure plate 54 is sandwiched between retainer plate 58 and skew plate 42. Second flexure plate 56 is simply fastened by means of plurality of screws 66 that extend through bores 68 and into threaded opening 70 in support 26. Flexure plates 54 and 56 thus have facing interior surfaces with each having an outer surface opposite its interior surface.

Figure 2:
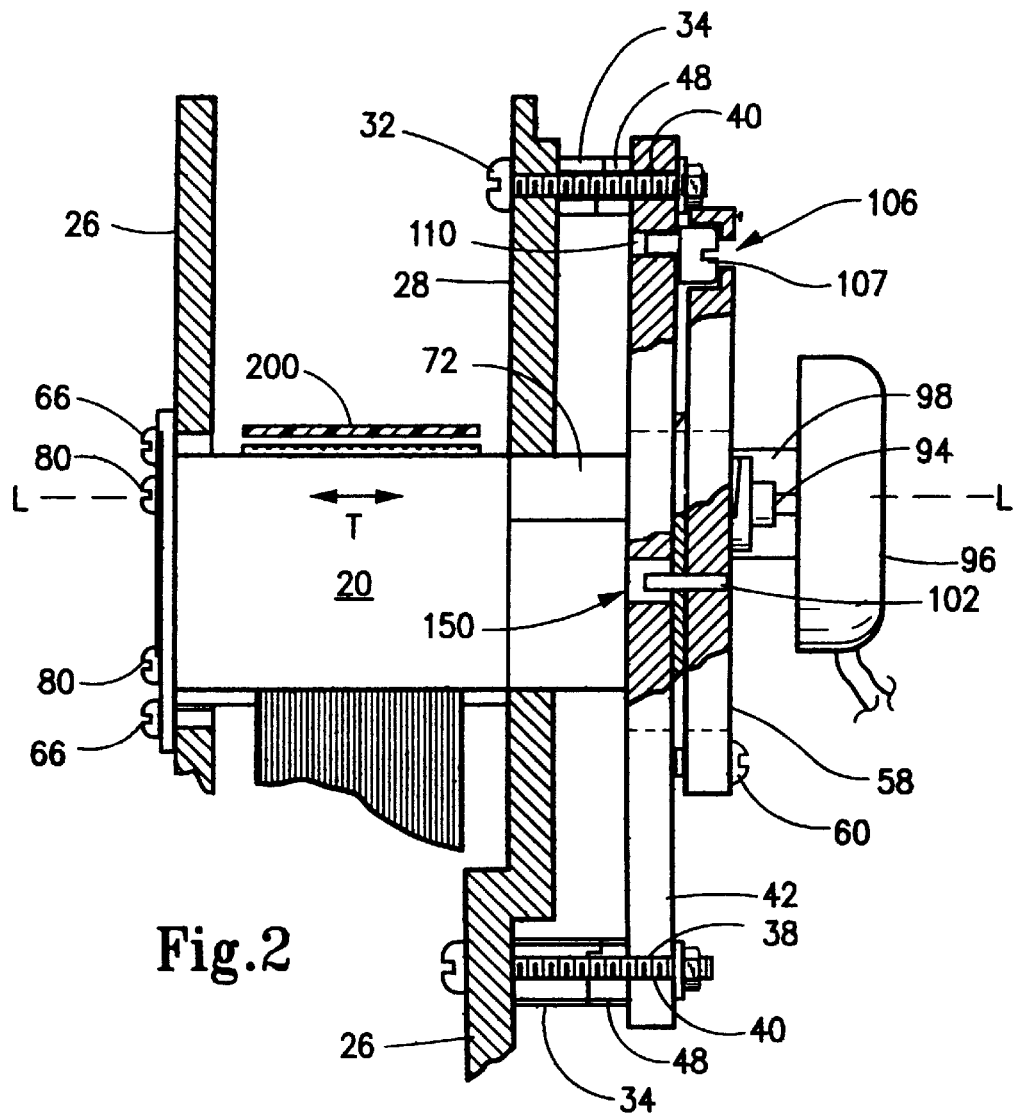
FIG. 2 is a side view in partial cross-section showing the position mechanism of the present invention.
Figure 4:
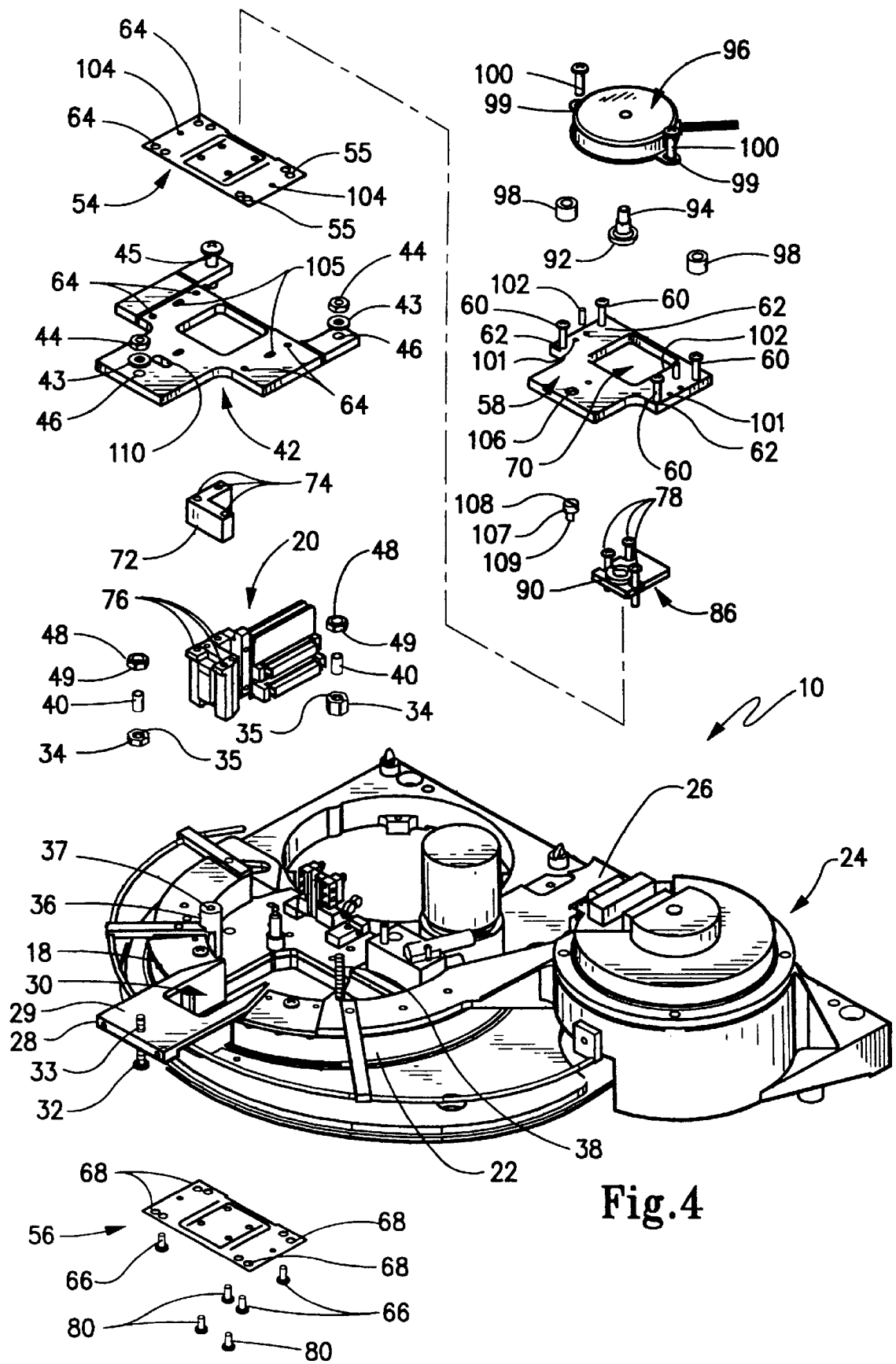
FIG. 4 is a front exploded view in perspective of the read/write recording head of FIG. 1.

Recording head 20 may be seen to extend between and be mounted to first flexure plate 54 and second flexure plate 56. To this end, as is shown in FIGS. 2–4, a head spacer block 72 is L-shaped in configuration and is provided with three through bores 74 which align with threaded bores 76 in head 20. Through bores 74 and threaded bores 76 receive bolts 78 which fasten recording head 20 and head spacer block 72 directly to flexure plate 54, as described more thoroughly below. Similarly, a second end of recording head 20 is fastened to second flexure plate 56 by means of bolts 80 that extend through openings 82 in second flexure plate 56 so as to be secured and threaded bores 84 in the second end of recording 20.

In order to translate recording head 20 along linear axis "L", a head cam block 86 is secured to an outer surface of first torsion spring 54 opposite the interior surface that confronts recording head 20. Head cam block 86 is provided with a plurality of through bores 88 through which bolts 78 extend. Thus, it should now be appreciated that the tightening of bolts 78 into threaded bores 76 in recording head 20 simultaneously clamps or fastens head cam block 86, first flexure plate 54, head spacer block 72 and recording head 20 securely together. Head cam block 86 includes an upstanding cam surface 90 which mates with a second cam surface 92 formed on shaft cam 94 that is received by a stepper motor 96 for controlled rotation thereof. Motor 96 is secured to retainer plate 58 by means of bolts 100 that extend through ears 102 of motor 96, through stand-offs 98 to be received in threaded bores 101. Cam surfaces 90 and 92 are preferably ½° inclines that provide total lift of 0.040 inches or more. Thus, a rotation of 180° of shaft cam 94 will result in head movement of 0.020 inches or more. Stepper motor 96 preferably has 400 steps per rotation, i.e., each step is an angular rotation of 0.9°. With the camming of surfaces 90 and 92 at ½°, each step provides a 0.00005 inch translation of recording head 20. Shaft cam 94 is formed of non-magnetic material, such as stainless steel, while head cam block 86 is formed of a lubricous plastic material.

To complete the construction of the head mounting and positioning assembly, it may be noted with respect to FIGS. 2–4 that retainer plate 58 and first flexure plate 54 are pinned together for common movement by a pair of pins 102 that extend through openings 103 in retainer plate 58 and through openings 104 in first flexure plate 54. Pins 102 are press-fit into holes 103 and 104 and protrude into enlarged holes 105 formed in skew plate 42. Thus, retainer plate 58 and first flexure plate 54 may be translated in a transverse plane with respect to skew plate 42. To control this translation, retainer plate 58 is provided with a countersunk bore 106 that receives head 108 of a horizontal adjustment cam 107. Cam 107 includes a longitudinally extending but actually off-set shaft 109 that extends into a slot 110 formed in skew plate 42.

The above described structure may now be appreciated to allow for independent adjustment of both axial skew of the translational axis of recording head 20 as well independent adjustment of tape penetration, that is, the distance between the surface of recording head 20 and tape medium 200 (see FIGS. 2 and 6) passing through recording device 10. In ordinary operation, it is expected that skew adjustment would first be adjusted. Here, skew plate 42 is loosely assembled by securing it with bolts 32 and mounting posts 36 and 38. Rotation of each of cam nuts 48 relative to cam nuts 34 will cause skew plate 42 to tilt relative to framework 26. This cam adjustment then allows factory or user alignment of head 20 for proper transverse movement with respect to a transport medium. At this point, nuts 44 and bolt 45 are tightened to lock in skew adjustment. Next, bolts 60 may be slightly loosened and an instrument, such as a screw driver, inserted through the smaller portion of countersunk bore 106 to engage head 108 of cam 107. By rotating head 108, retainer plate 58 and first flexure plate 54 are moved so that tape head 20 moves toward and away from the recording medium due to the off-set of shaft 109 acting in slot 110 of skew plate 42. This adjusts tape penetration without altering the skew of plate 42.

Figure 5:
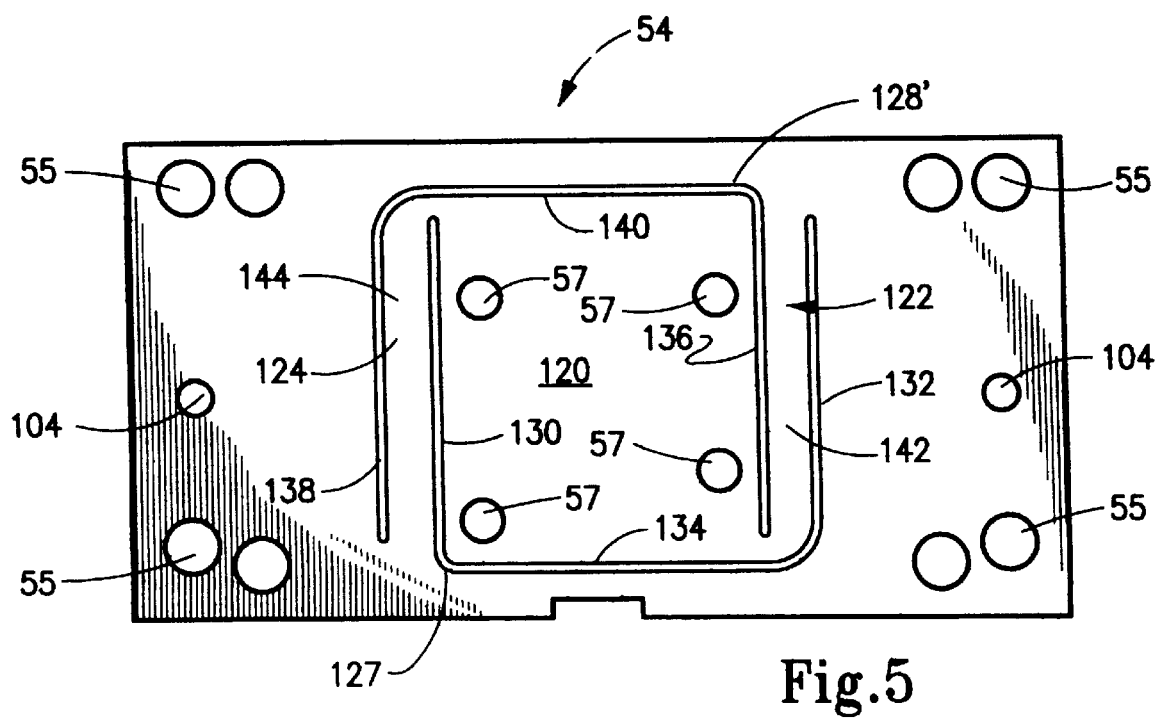
FIG. 5 is a front view in elevation of a first torsion spring used in the positioning mechanism according to the exemplary embodiment of the present invention.
Figure 6:
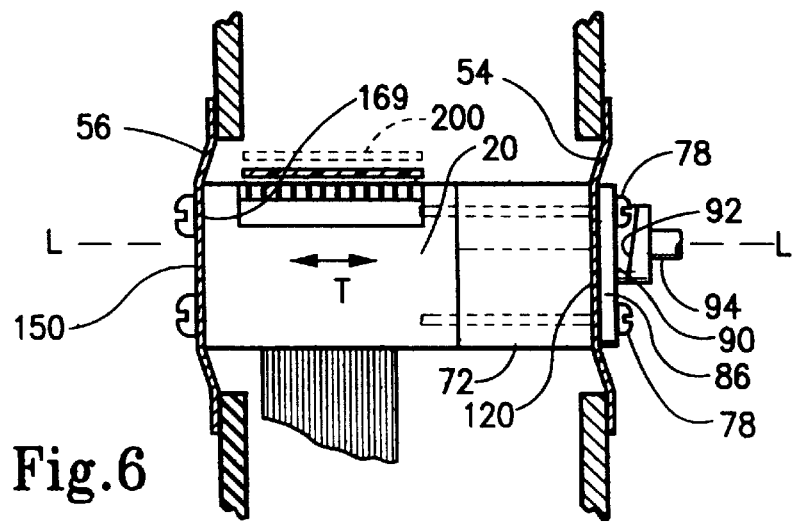
FIG. 6 is a side view in partial cross-section showing a translational movement of the recording head by the positioning mechanism of the present invention.

Before explaining the operation of the positioning mechanism according to the present invention, it is helpful to review, in greater detail, the construction of each of flexure plate 54 and 56, which may be noted to be identical. Turning first to FIG. 5, it may be seen that representative first flexure plate 54 is in the form of a flat spring steel or beryllium-copper plate having a region 120 that is supported by torsion spring portions 122 and 124 at opposite diagonal corners. Central region 120 along with torsion spring portions 122, 124 is formed by a cut profile formed through the centrally of flexure plate 54. This cut profile is defined by a pair of symmetrical U-shaped cuts 127, 128 with U-shaped cut 128 being inverted and overlapped with respect to U-shaped cut 127. U-shaped cut 127 has a pair of spaced apart leg portions 130, 132 which are parallel to one another and perpendicular to an inner connecting cut 134. Similarly, U-shaped cut 128 includes a pair of leg cuts 136 and 138 which are parallel to one another and perpendicular to a joining cut 140. Accordingly, the region between cuts 136 and 132 form a torsion bar 142 while the region of flexure plate 54 between cuts 130 and 138 form a torsion bar 1444 which flexes with a restorative force so as to allow flexure portion 120 to move inwardly and outwardly in the view shown in FIG. 5. As noted, the construction of second flexure plate 56 is identical to first flexure plate 54; however, the cut profile is of second flexure plate 56 rotated 180° during use with respect to an axis perpendicular to the translation axis "L". Thus, as is shown in FIG. 6, flexure plate 56 is again formed of the spring material, again preferably beryllium/copper and has a central flexure region 150 formed by similar first and second symmetrical U-shaped cuts as described above. Central region 150 may thus flex for movement inwardly and outwardly as shown in FIG. 6.

With the structure shown for first torsion spring 54 and second torsion spring 56, it may now be appreciated in reference to FIGS. 2 and 6 that rotation of shaft cam 94 by means of motor 92 causes cam surface 92 to act on cam surface 90 of head cam block 86 to translate recording head 20 in the direction of arrow "T". As shaft cam 94 moves recording head 20 to the left (as shown in FIG. 6) central region 120 and 150 of flexure plates 54 and 56, respectively, can bend against the spring constant of their respective torsion bars. When shaft cam 94 is reversed, the restorative forces of flexure portions 110 and 140 move recording head to the right (again as is shown in FIG. 6). While it is not essential, it is preferred that the spring constant of torsion spring 56 be the same as the spring constant of torsion spring 54. If it is desired to have different spring constant then, torsion spring 56 may be formed out of the same material as torsion spring 54 but be slightly thicker in dimension.

It is important to understand that, each individual flexure region 120, 150 would tend to rotate or swivel as it underwent a flexing motion. This motion would cause a rotation of head 20 angularly about the translation axis "L" and such rotation is highly undesirable. However, this tendency to rotate can be simply addressed by making sure that the cut profiles for springs 54 and 56 provide counteracting torques when the positioning mechanism is assembled. That is, as is best shown in FIG. 4, the cut profiles are rotated 180° about an axis that is perpendicular to translation axis "L". With reference to FIGS. 5 and 6, it should be appreciated that the first end of recording head 20 is attached to the interior surface of torsion spring 154 opposite outer surface 138 while the second end of recording head 20 is mounted to inner surface 169 of torsion spring 56. Thus, the rotational torque of each of torsion springs 54 and 56 are opposite one another and cancel out thus preventing relative rotation of recording head 20 about linear axis "L".

In the preferred embodiment, the cut profiles which form central flexure regions 120 and 150 are U-shaped cuts generally describing three sides of a square with these U-shaped cuts being inverted with respect to one another and overlapped to form the torsion bars. However, it should be expressly understood that any suitable torsion spring system which would both allow translational movement of the recording head 20 along axis "L" would be sufficient so long as the torsion springs have counteracting rotational torques to prevent rotation of recording head 20. This can be accomplished by generally any cut profile for the flexure plates 54 and 56 which each provide a pair of torsion bars. By using an identical cut profile and by rotating the profiles 180° with respect to one another about an axis that is perpendicular to the axis of translation, the cut profiles will provide opposite torques during flexure thus resisting rotation. Accordingly, a wide variety of profiles are contemplated by this invention as should be apparent to the ordinarily skilled engineer in this field.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A positioning mechanism operative to selectively position a recording head relative to a support structure which supports said recording head and a recording medium employed therewith, comprising:

(a) a drive operative to translate said recording head along a linear axis such that said recording head is positionable at intermediate positions between first and second locations; and (b) first and second torsion springs disposed on opposite ends of said recording head and arranged to apply opposite angular torques to said recording head thereby to resist angular rotational movement of said recording head about the linear axis in a plane that is perpendicular to the linear axis.

2. A positioning mechanism according to claim 1 wherein each of said first and second torsion springs is formed out of a flat flexure plate having a cut profile defining a flexure portion thereof, said opposite ends of said recording head respectively engaging the flexure portions of said first and second torsion springs.

3. A positioning mechanism according to claim 2 wherein each of the cut profiles is defined by a pair of U-shaped cuts with one of said U-shaped cuts being inverted with respect to another one said U-shaped cuts and with said U-shaped cuts overlapping one another to define the flexure portion.

4. A positioning mechanism according to claim 2 wherein said cut profiles are identical with respect to one another with the cut profile on said second torsion spring being rotated 180° to the cut profile on said first torsion spring relative to an axis that is perpendicular to the linear axis.

5. A positioning mechanism according to claim 2 wherein said recording head is secured to the flexure portion of one of said first and second torsion springs.

6. A positioning mechanism according to claim 5 wherein said recording head is secured to the flexure portion of each of said first and second torsion springs.

7. A positioning mechanism according to claim 5 including a recording head spacer block interconnecting said recording head to the flexure portion of said one of said first and second torsion springs.

8. A positioning mechanism according to claim 1 wherein said drive includes a rotatable first cam having a first cam surface oriented transversely to the linear axis and a motor operative to rotate said first cam such that said cam surface operates to translate said recording head in a first direction along the linear axis against a restorative force of one of said first and second torsion springs.

9. A positioning mechanism according to claim 8 including a head cam block secured to one of said first and second torsion springs, said head cam block having a second cam surface oriented transversely to the linear axis and engaged by the first cam surface.

10. A positioning mechanism according to claim 1 including means for selectively adjusting skew of the linear axis relative to the support structure.

11. A positioning mechanism according to claim 10 including means for selectively adjusting distance between the recording head and the recording medium independently of the skew of the linear axis.

12. A positioning mechanism according to claim 1 including means for selectively adjusting distance between the recording head and the recording medium.

13. A head assembly adapted to read/write data on a recording medium that is advanced in a feed direction by transport mechanism that includes a support frame, comprising:

(a) a first flat flexure plate supported on said support frame and including a first flexure portion;

(b) a second flat flexure plate supported on said support frame in spaced relation to said first flat flexure plate and including a second flexure portion, said first and second flexure portions having opposed facing interior surfaces;

(c) a recording head disposed between said first and second flexure portions, said recording head having a first end engaging said first flexure portion on the interior surface thereof and having a second end engaging said second flexure portion on the interior surface thereof; and (d) a drive disposed at the first end of said recording head and operative to advance said recording head in a first direction along a linear axis such that a restorative force is applied that is operative to advance said recording head in a second direction along the linear axis opposite the first direction, said first and second flexure portions configured and oriented so that said first flexure portion applies a first angular torque force that is opposite a second angular torque force applied by said second flexure portion thereby to resist angular rotation of said recording head about the linear axis.

14. A head assembly according to claim 13 wherein said first and second flexure portions are each formed as a cut profile having a pair of U-shaped cuts with one of said U-shaped cuts being inverted with respect to another one of said U-shaped cuts and with said U-shaped cuts overlapping one another thereby to define a respective flexure portion at a central location of the cut profile, said flexure portion supported by torsion bars at opposite diagonal corners of the cut profile.

15. A head assembly according to claim 14 wherein said cut profiles are identical with respect to one another with the cut profile on said second torsion spring being rotated 180° to the cut profile on said first torsion spring relative to an axis that is perpendicular to the linear axis.

16. A head assembly according to claim 15 wherein said second flat flexure plate is thicker that said first flat flexure plate.

17. A head assembly according to claim 13 wherein said recording head is secured to the first flexure portion.

18. A head assembly according to claim 17 wherein said recording head is secured to the second flexure portion.

19. A head assembly according to claim 13 wherein said drive includes a rotatable first cam having a first cam surface oriented transversely to the linear axis and a head cam block secured to an outer surface of said first flexure portion opposite the interior surface thereof, said head cam block having a second cam surface oriented transversely to the linear axis and engaged by the first cam surface, and including a motor operative to rotate said first cam such that said first and second cam surfaces operate to translate said recording head in a first direction along the linear axis against a restorative force of said torsion spring portion.

20. A head assembly according to claim 13 wherein one of said first and second flexure plate is adjustably secured to said support frame as to be variably positionable in a selected skew orientation with respect thereto.

21. A head assembly according to claim 13 wherein one of said first and second flexure plates is adjustably secured to said support frame such that distance of separation of said recording head and the recording medium may be selectively varied.

22. A device operative to read/write data on a recording medium disposed in a holder therefor, comprising:
(a) a support frame having a docking station adapted to receive said holder and said recording medium;
(b) a take-up mechanism operative to advance the recording medium in a feed direction;
(c) bearing elements operative to support said recording medium as it is advanced in the feed direction from said holder to said take-up mechanism when said holder is in the docking station;
(d) a recording head disposed adjacent to said recording medium when said recording medium is advanced in the feed direction, said recording head oriented transversely to the feed direction;
(e) a first flat flexure plate supported on said support frame and including a first flexure portion;
(f) a second flat flexure plate supported on said support frame in spaced relation to said first torsion spring and including a second flexure portion, said first and second flexure portions having opposed facing interior surfaces, said recording head having a first end engaging said first flexure portion on the interior surface thereof and having a second end engaging said second flexure portion on the interior surface thereof; and
(g) a drive disposed at the first end of said recording head and operative to advance said recording head in a first direction along a linear axis such that a restorative force is created, such restorative force operative to advance said recording head in a second direction along the linear axis opposite the first direction, said first and second flexure portions configured and oriented so that said first flexure portion applies a first angular torque force that is opposite a second angular torque force applied by said second flexure portion thereby to resist angular rotation of said recording head about the linear axis.

23. A positioning mechanism operative to selectively position a recording head relative to a support structure which supports said recording head and a recording medium employed therewith, comprising:
(a) a drive operative to translate said recording head along a linear axis such that said recording head is positionable at intermediate positions between first and second locations; and
(b) first and second torsion springs disposed on opposite ends of said recording head and arranged to apply opposite angular torques to said recording head thereby to resist rotational movement of said recording head about the linear axis, each of said first and second torsion springs being formed out of a flat flexure plate having a cut profile defined by a pair of U-shaped cuts with one of said U-shaped cuts being inverted with respect to another with said U-shaped cuts overlapping one another to define a flexure portion thereof, said opposite ends of said recording head respectively engaging the flexure portions of said first and second torsion springs.

24. A positioning mechanism according to claim 23 wherein said cut profiles are identical with respect to one another with the cut profile on said second torsion spring being rotated 180° to the cut profile on said first torsion spring relative to an axis that is perpendicular to the linear axis.

* * * * *